Jan. 25, 1944.　　　S. O. WHITE　　　2,339,969
TRANSMISSION SYNCHRONIZER
Filed May 16, 1938
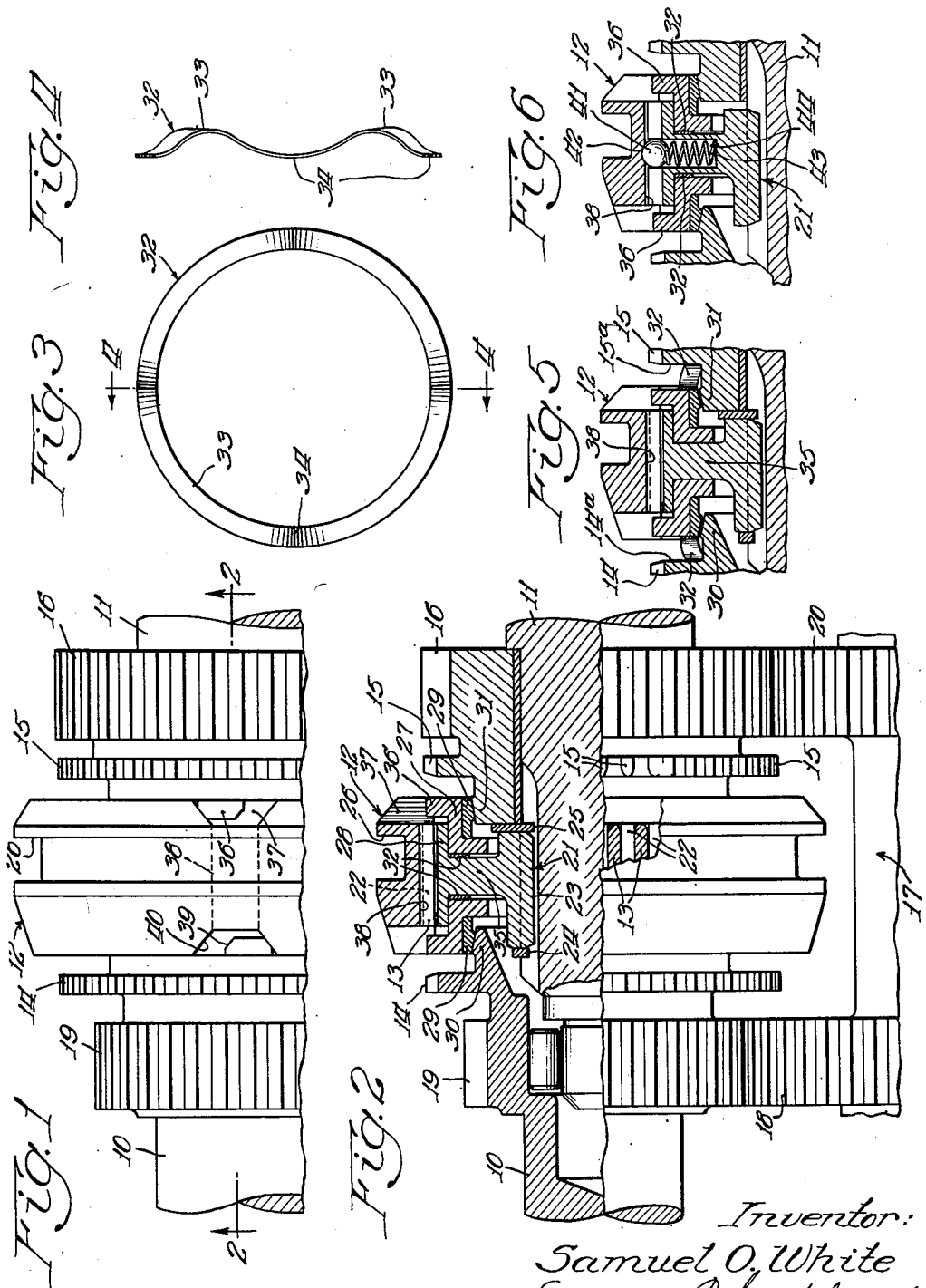
Inventor:
Samuel O. White
By Edward C. Gritzbaugh
Atty.

Patented Jan. 25, 1944

2,339,969

UNITED STATES PATENT OFFICE 2,339,969

TRANSMISSION SYNCHRONIZER

Samuel O. White, Muncie, Ind., assignor to Borg-Warner Corporation, Chicago, Ill., a corporation of Illinois Application May 16, 1938, Serial No. 208,108

1 Claim. (Cl. 192—53)

This invention relates to synchronizing change-speed gear transmissions of the type employed, for example, in motor vehicles, wherein there is provided means for effecting synchronization of a pair or pairs of torque-transmitting members, preparatory to connecting said members in positive drive engagement with each other.

The invention is particularly directed to synchronizing transmissions of the type wherein the synchronizing means comprises friction clutch elements drivingly associated with the respective torque-transmitting members, and adapted to be moved into engagement with each other in the initial stage of the shifting movement, and wherein there is incorporated so-called "blocker" mechanism for preventing the positive drive engagement of the members prior to the time that synchronization is effected.

An object of the invention is to completely eliminate in a synchronizer of this type the possibility of failure resulting from the occasional passing of the movable clutch element through the blocker mechanism prior to synchronization. Such failures can occasionally occur in conventional synchronizers, where the operator's shifting stroke is quick and powerful.

The invention has as another object to simplify existing synchronizer construction, particularly by eliminating the resilient detent thrust connection now employed in conventional synchronizers for transmitting from the shiftable clutch element to the synchronizer rings of such a synchronizer, the requisite axial thrust for effecting synchronizing engagement between the friction clutch elements.

To this end, the invention contemplates the utilization of the blocking engagement between the blocker-synchronizer ring and the movable clutch element as the means for transmitting axial thrust from the latter to the former to effect synchronization and provides specific means for initially biasing the blocker-synchronizer rings in blocking position with respect to the movable clutch, so that such blocking engagement may be relied upon for this purpose.

In one form of the invention there is interposed between the blocker-synchronizer rings and their coacting clutch elements, resilient means yieldingly engaged therewith so as to lightly transmit torque therebetween, and thereby to constantly bias the blocker-synchronizer rings at their limits of lost motion adjustment with respect to the hub member in which they are mounted. In connection with this form of the invention, it is my purpose to utilize the resilient means for the additional function of maintaining the blocker-synchronizer rings out of engagement with their coacting clutch elements except at such times as they are being urged thereagainst during the synchronizing operation.

In another form of the invention, a slight rotative driving effort is constantly maintained between the synchronizer rings and their complements, by the maintenance of a very light yielding engagement between their coacting friction faces at all times, such engagement being insufficient to seriously shorten the life of the friction faces through constant wear, but sufficient to accomplish the biasing function. In this respect, reliance is placed upon the adhesive properties of the oil film or films existing between the friction faces, for transmitting rotational drag from one of the rotating clutch elements to the other, without actual metal to metal contact, whereby the life of the friction faces under such constant rotative engagement with each other is as long or longer than that of a correspondingly lubricated anti-friction bearing of the bushing type having equivalent dimensions.

In either form of the invention there is contemplated the employment of a very slight but constantly effective driving torque between the blocker-synchronizer rings and their complementary clutch elements, or other members with which they are adapted to have relative rotation, such light driving torque being insufficient to produce damaging wear of the parts, and inadequate for the completion of synchronization, but sufficient to ensure the biasing of the blocker rings in constantly blocking relation to the shiftable clutch element.

Other objects, the advantages and uses of the invention will become apparent after reading the following specification and claims, and after consideration of the drawing forming a part of the specification, wherein:

Fig. 1 is a plan view of a portion of a synchronizing transmission embodying the invention;

Fig. 2 is a partial axial sectional view of the same, taken on the line 2—2 of Fig. 1;

Fig. 3 is a side elevation of one of the biasing washers;

Fig. 4 is a sectional view of the same taken on the line 4—4 of Fig. 3;

Fig. 5 is a partial axial sectional view of a modified form of the invention; and Fig. 6 is a view similar to Fig. 5 of another modification of the invention.

I have selected, as illustrative of one form in which the present invention may be embodied, a transmission mechanism of a conventional type wherein a positive drive connection may be established between torque-transmitting members comprising a drive shaft 10 and a driven shaft 11, either in direct drive one to one ratio, or in a reduced gear ratio, by axially shifting a movable clutch element designated generally at 12, so that its clutch teeth 13 move into positive clutching engagement with clutch teeth 14 formed on the drive shaft 10 or with clutch teeth 15 formed on a torque-transmitting member in the form of a gear 16 journalled on the shaft 11 and in constant reduction geared relationship with the drive shaft 10 through the medium of a counter-gear assembly 17, having a gear 18 meshing with a gear 19 formed on the drive shaft 10, and having a gear 20 meshing with the gear 16. The movable clutch element 12 encircles and is splined upon the periphery of a torque-transmitting member 21 by means of the teeth 13 meshing with splines 22 on the member 21, the latter being commonly referred to as the hub. The hub in turn is splined, as at 23, on the shaft 11, and is secured against axial movement by retaining washers 24 and 25, respectively.

Thus the movable clutch element 12 is drivingly connected to the driven shaft 11, while free to shift axially with respect thereto. Upon being shifted into clutching engagement with the direct drive clutch teeth 14, the movable clutch element 12 will receive rotative movement therefrom, and transmit it in direct one to one ratio through the hub 21 to the driven shaft 11. Upon being shifted into clutching engagement with the clutch teeth 15 of the reduction gear train, the movable clutch element 12 will receive rotative movement through the reduction gearing so as to transmit rotation to the shaft 11 at a reduced rate of speed. Shifting of the movable clutch element 12 is effected by a conventional manually operated fork engaging in a peripheral groove 26 therein.

Preparatory to shifting the movable clutch element 12 into positive clutching engagement with a clutch member 14 or 15, synchronization of the two elements thus to be positively connected is effected by means of one of the blocker-synchronizer rings 27, axially recessed into the respective sides of the hub and supported by bearing engagement with the internal faces of the rim portion 28 thereof. Each of the blocker-synchronizer rings 27 has an internal friction clutch facing 29 adapted to coact with a conical friction clutch element 30 or 31 respectively, formed on the torque-transmitting members 19 and 16.

In the form of the invention shown in Fig. 2, a very light constant pressure is maintained against the blocker-synchronizer rings, so as to maintain a constant engagement between their friction facings 29 and their complementary friction clutch elements 30 and 31, respectively. This is accomplished by means of very light spring washers 32, similar to those shown in Figs. 3 and 4, which are axially undulated, as shown, so as to provide alternate oppositely directed undulations 33 and 34, respectively, adapted to respectively engage the adjacent faces of the synchronizer rings and the web portion 35 of the hub 21, between which faces, the washers 32 are interposed. In Fig. 4 the undulations of the washer 32 are shown considerably exaggerated with respect to the form of washer actually used in the arrangement shown in Fig. 2. Such washers have only slight undulations, just enough to take up the play between the blocker-synchronizer rings, the hub, and the complementary clutch elements.

Limited rotational movement or oscillation of the blocker-synchronizer rings with respect to the hub is provided for by lugs 36 projecting radially outwardly from the blocker-synchronizer rings and received in notches 37 in the movable clutch element 12. The notches 37 are sufficiently wider than the lugs 36 to allow the blocker-synchronizer rings 27 to shift circumferentially from a centered position in which the lugs 36 register with axial grooves 38 in the movable clutch element 12, of sufficient width to receive the lugs 36, to positions blocking axial movement of the movable clutch element 12, as shown in Fig. 1. Thus it is assured that when the shiftable clutch element 12 is moved axially in the commencement of a shifting operation, it will engage the lugs 36 and exert axial pressure thereagainst, whereby to develop sufficient clutching engagement between the friction clutch elements 29 and 30 or 31 to effect synchronization, by causing said elements to approach the same speed. As long as relative rotation exists between said elements, the synchronizer ring will remain biased, the biasing torque increasing with increasing engagement of the friction clutch elements. When synchronization is reached, however, there will be a momentary reversal of the direction of rotation of the torque-transmitting members relative to each other, causing the synchronizer-blocker ring to be oscillated toward its other limit of movement relative to the hub 21, and in doing so, it will reach a position wherein the grooves 38 of the movable clutch element are in register with the blocker lugs 36, whereupon the movable clutch element may advance into clutching engagement with the teeth 30 or 31 of the driving members. Entry of the lugs 36 into the groovees 38 is facilitated by the chamfered faces 39 and 40 of the lugs 36 and notches 37, respectively. It is to be understood that the invention is not limited to the use of the particular type of blocker mechanism just described. For example, the blocking may be accomplished by blocker teeth on the blocker-synchronizer rings, adapted in the biased position of the blocker-synchronizer rings to register with the ends of the teeth 13 of the movable clutch element, and other means may be provided for effecting the lost motion connection between the blocker-synchronizer rings and the hub, as shown, for example, in application Serial No. 100,237, filed September 11, 1936, now Patent No. 2,129,342, issued Sept. 6, 1938.

In the form of the invention shown in Fig. 5, spring washers 32 are interposed between the blocker-synchronizer rings and their coacting driving members 14a and 15a (on which the clutch teeth 14 and 15 are formed), respectively. The frictional engagement of the undulations 33 against the members 14a and 15a, and the frictional engagement of the undulations 34 against the blocker-synchronizer rings, serves to transmit a slight amount of torque between these members so as to bias the synchronizer-blocker rings in blocking relation to the movable clutch element 12. The washers 32 also serve to normally maintain the synchronizer-blocker rings out of engagement with their coacting friction clutch members 30 and 31. With this exception, the operation is the same as in the preferred form of the invention hereinbefore described.

As a result of the constant bias of the synchronizer rings, it is impossible, no matter how rapidly the shifting movement may be initiated, to cause the movable clutch element to pass the blocker mechanism prior to synchronization. Another advantage of the invention is in the elimination of poppet or detent means acting between the movable clutch element and the hub, for transmitting the thrust required for synchronization, thus considerably simplifying and lessening the cost of manufacture of synchronizers of this type.

In the form shown in Fig. 6, the hub 21, instead of being axially fixed on the driven shaft 11, is axially slidable thereon. A conventional poppet or detent mechanism, including a ball 41 engaged in a depression 42 in the movable clutch element 12 under the urge of a coil spring 43, seated in a pocket 44 in the hub 21, may be employed as a conventional means for transmitting thrust from the movable clutch element to the blocker-synchronizer rings. The spring washers 32, the same as in the preferred form shown in Fig. 2, in this form of the invention serve the same function of biasing the synchronizer rings in advance of any movement of the movable clutch element. The arrangement has the advantage of guarding against any accidental premature passage of the blocker lugs 36 into the grooves 38 in the event of an unusually quick shifting movement, quick enough to anticipate the blocking movement conventionally produced by the initial friction clutching engagement. It also has the "feel" of the conventional synchronizer shift. It does not, however, possess the advantage of eliminating the expense of the poppet construction.

Other suitable means may be employed for maintaining a constant light engagement between the friction faces of the synchronizer element for biasing the synchronizer ring in block-in position.

I claim:

In a synchronizing transmission, a pair of torque-transmitting members mounted in axial alignment, a movable jaw clutch element carried by one of said members and adapted to be axially shifted into engagement with a jaw clutch element carried by the other member, thus to establish a positive drive connection between said members, a synchronizer ring carried by said one member, having a lost motion driving connection therewith, having a friction clutch face adapted under axial pressure to establish synchronizing engagement with a coacting friction clutch face on said other member, and having blocking means adapted in one of its positions permitted by said lost motion connection, to block the path of axial shifting movement of said movable clutch element and, in another of such positions, to allow the movable clutch element to complete its axial shifting movement, and an axially undulated washer of thin spring metal interposed between said synchronizer ring and said other torque-transmitting member so as to normally maintain said synchronizer ring disengaged from said other member, and so as to transmit a slight amount of torque between said other member and said synchronizer ring, whereby to normally maintain said synchronizer ring biased in blocking relation to said movable clutch element, so that engagement of the latter with said blocking means during the initial phase of said shifting movement serves to transmit axial thrust from the movable clutch element to the synchronizer ring for effecting synchronizing engagement between said friction clutch faces.

SAMUEL O. WHITE.